(12) United States Patent
Ross (10) Patent No.: US 8,316,418 B2
(45) Date of Patent: *Nov. 20, 2012

(54) VERIFICATION ENGINE FOR USER AUTHENTICATION

(75) Inventor: David Justin Ross, Redmond, WA (US)

(73) Assignee: RAF Technology, Inc., Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/230,471

(22) Filed: Sep. 12, 2011

(65) Prior Publication Data

US 2012/0005733 A1    Jan. 5, 2012

Related U.S. Application Data

(63) Continuation of application No. 12/613,410, filed on Nov. 5, 2009, now Pat. No. 8,032,927, which is a continuation of application No. 10/003,719, filed on Oct. 30, 2001, now abandoned.

(60) Provisional application No. 60/244,422, filed on Oct. 30, 2000.

(51) Int. Cl.
*H04L 29/06* (2006.01)

(52) U.S. Cl. ............. 726/3; 726/2; 726/4; 726/5; 726/6; 726/17; 726/18; 726/21; 709/225; 709/227; 707/705; 707/706; 707/723; 707/726; 707/748; 707/758; 707/770; 705/53; 705/65; 705/67; 705/78; 705/7.14

(58) Field of Classification Search ........................ None
See application file for complete search history.

(56) References Cited

U.S. PATENT DOCUMENTS

| 4,890,323 | A | 12/1989 | Beker |
|---|---|---|---|
| 5,259,025 | A | 11/1993 | Monroe |
| 5,265,159 | A | 11/1993 | Kung |
| 5,375,244 | A | 12/1994 | McNair |
| 5,436,970 | A | 7/1995 | Ray |

(Continued)

FOREIGN PATENT DOCUMENTS

WO    WO 99/22330    5/1999

(Continued)

OTHER PUBLICATIONS

Allison Linn, "Microsoft Unveils .NET Strategy," The Seattle Times, Mar. 19, 2001, published on the Internet at <http://dailynews.yahoo.com/h/xseap/20010319/lo/microsoft_hailstorm_1.html>.

(Continued)

*Primary Examiner* — Syed A. Zia (74) *Attorney, Agent, or Firm* — Stolowitz Ford Cowger LLP (57) ABSTRACT

Computer-implemented system and methods for authenticating the identity of a person, for example a customer (1) of an E-Commerce web site (15). The web site or other verification "client" (110) contacts a verification engine (10, 100) ("Authentex"), which may be implemented as a web server (604). The verification engine (10), in turn, has limited access to a plurality of independent, third-party secure databases (21, 112) which are maintained by Trusted Validators (3, 610, 620, etc), which are entities such as banks that have a pre-existing relationship with customer (FIG. 4), and due to that relationship, acquire and maintain "out-of-wallet" data (4) that may be useful to authenticate the identity of the customer. That confidential customer data—held by the third-party "Trusted Validators"—is not disclosed.

12 Claims, 6 Drawing Sheets

U.S. PATENT DOCUMENTS

| Patent | Date | Name | Ref |
|---|---|---|---|
| 5,613,004 A | 3/1997 | Cooperman | |
| 5,687,236 A | 11/1997 | Moskowitz | |
| 5,742,685 A | 4/1998 | Berson | |
| 5,774,525 A | 6/1998 | Kanevsky | |
| 5,774,551 A | 6/1998 | Wu | |
| 5,832,497 A | 11/1998 | Taylor | |
| 5,838,814 A | 11/1998 | Moore | |
| 5,841,886 A | 11/1998 | Rhoads | |
| 5,841,888 A | 11/1998 | Setlak | |
| 5,844,817 A | 12/1998 | Lobley | |
| 5,850,442 A | 12/1998 | Muftic | |
| 5,870,499 A | 2/1999 | Bender | |
| 5,870,723 A | 2/1999 | Pare, Jr. | |
| 5,872,848 A | 2/1999 | Romney | |
| 5,883,810 A | 3/1999 | Franklin | |
| 5,884,270 A * | 3/1999 | Walker et al. | 705/321 |
| 5,893,090 A | 4/1999 | Friedman | |
| 5,910,988 A | 6/1999 | Ballard | |
| 5,940,507 A | 8/1999 | Cane | |
| 5,973,731 A | 10/1999 | Schwab | |
| 5,987,440 A | 11/1999 | O'Neil | |
| 5,991,408 A | 11/1999 | Pearson | |
| 6,002,931 A * | 12/1999 | Yamaguchi et al. | 455/433 |
| 6,014,650 A | 1/2000 | Zampese | |
| 6,026,166 A | 2/2000 | LeBourgeois | |
| 6,026,491 A | 2/2000 | Hiles | |
| 6,039,248 A | 3/2000 | Park | |
| 6,073,242 A * | 6/2000 | Hardy et al. | 726/1 |
| 6,085,322 A | 7/2000 | Romney | |
| 6,111,954 A | 8/2000 | Rhoads | |
| 6,118,872 A | 9/2000 | Kashima | |
| 6,122,403 A | 9/2000 | Rhoads | |
| 6,125,349 A | 9/2000 | Maher | |
| 6,175,923 B1 | 1/2001 | Bailey | |
| 6,202,151 B1 | 3/2001 | Musgrave | |
| 6,230,148 B1 | 5/2001 | Pare, Jr. | |
| 6,263,447 B1 | 7/2001 | French | |
| 6,282,532 B1 * | 8/2001 | Sandell | 707/738 |
| 6,282,658 B2 | 8/2001 | French | |
| 6,363,376 B1 * | 3/2002 | Wiens et al. | 1/1 |
| 6,363,485 B1 | 3/2002 | Adams | |
| 6,385,620 B1 * | 5/2002 | Kurzius et al. | 1/1 |
| 6,496,936 B1 * | 12/2002 | French et al. | 726/7 |
| 6,532,459 B1 * | 3/2003 | Berson | 1/1 |
| 6,581,059 B1 * | 6/2003 | Barrett et al. | 1/1 |
| 6,618,806 B1 | 9/2003 | Brown | |
| 6,643,648 B1 | 11/2003 | Ross | |
| 6,714,944 B1 * | 3/2004 | Shapiro et al. | 1/1 |
| 6,836,845 B1 * | 12/2004 | Lennie et al. | 713/181 |
| 6,845,453 B2 | 1/2005 | Scheidt | |
| 6,904,407 B2 * | 6/2005 | Ritzel | 705/321 |
| 6,959,394 B1 | 10/2005 | Brickell | |
| 6,985,887 B1 * | 1/2006 | Sunstein et al. | 705/51 |
| 7,039,951 B1 | 5/2006 | Chaudhari | |
| 7,080,403 B2 | 7/2006 | McCaffrey | |
| 7,086,085 B1 | 8/2006 | Brown | |
| 7,131,009 B2 | 10/2006 | Scheidt | |
| 7,185,205 B2 | 2/2007 | Launchbury | |
| 7,231,657 B2 * | 6/2007 | Honarvar et al. | 726/2 |
| 7,318,048 B1 * | 1/2008 | King | 705/39 |
| 7,330,826 B1 * | 2/2008 | Porat et al. | 705/26.3 |
| 7,333,987 B2 * | 2/2008 | Ross et al. | 707/693 |
| 7,343,623 B2 | 3/2008 | Ross | |
| 7,356,168 B2 | 4/2008 | Tavares | |
| 7,433,826 B2 * | 10/2008 | Korosec | 705/317 |
| 7,467,401 B2 * | 12/2008 | Cicchitto | 726/4 |
| 7,657,931 B2 | 2/2010 | Margolus | |
| 7,676,433 B1 * | 3/2010 | Ross et al. | 705/39 |
| 7,740,168 B2 * | 6/2010 | Hammad et al. | 235/379 |
| 7,748,029 B2 | 6/2010 | Ross | |
| 7,761,374 B2 * | 7/2010 | Sahota et al. | 705/39 |
| 7,979,894 B2 * | 7/2011 | Royyuru et al. | 726/2 |
| 8,032,927 B2 * | 10/2011 | Ross | 726/3 |
| 8,249,957 B2 * | 8/2012 | Mullen et al. | 705/30 |
| 2002/0091945 A1 | 7/2002 | Ross | |
| 2003/0126094 A1 * | 7/2003 | Fisher et al. | 705/75 |
| 2005/0055231 A1 * | 3/2005 | Lee | 705/1 |
| 2006/0106636 A1 * | 5/2006 | Segal | 705/1 |
| 2008/0097925 A1 * | 4/2008 | King | 705/67 |

FOREIGN PATENT DOCUMENTS

| | | |
|---|---|---|
| WO | WO 99/60481 A1 | 11/1999 |
| WO | WO 02/41114 A2 | 5/2002 |
| WO | WO 03/103215 A1 | 12/2003 |

OTHER PUBLICATIONS

PressPass, "Microsoft's Bill Gates Preview New 'HailStorm' Technologies to Usher in New Era of More Consistent, Personalized and User-Centric Experiences," Mar. 19, 2001, published on the Internet at <http://www.microsoft.com/PressPass/press/2001/Mar01-19HailstormPR.asp>.

PressPass, "Microsoft Announces 'HailStorm,' a New Set of XML Web Services Designed to Give Users Greater Control," Mar. 19, 2001, published on the Internet at <http://microsoft.com/PressPass/features/2001/mar01/03-19hailstorm.asp>.

PCT International Search Report dated Jul. 9, 2002, for International Application No. PCT/US01/46135.

PCT/US03/17072 International Search Report dated Aug. 20, 2003.

* cited by examiner

FIG. 3  Authentex Authentication Operations

FIG. 4  Ordinary Business Affairs

FIG. 5  User Identity Authentication Session

FIG. 6

VERIFICATION ENGINE FOR USER AUTHENTICATION

RELATED APPLICATIONS

This application is a continuation of U.S. application Ser. No. 12/613,410 filed Nov. 5, 2009, which is a continuation of application Ser. No. 10/003,719 filed Oct. 30, 2001, which claims priority from U.S. Provisional Patent App. No. 60/244,422, filed Oct. 30, 2000, all of which are hereby incorporated by reference.

TECHNICAL FIELD

The present invention relates to the field of remote user authentication and, in particular, user authentication employing information stored in multiple, independently controlled databases.

BACKGROUND OF THE INVENTION

Presently, many systems employ security measures to protect proprietary or highly sensitive information they possess. One common aspect of the security measures often includes authentication (i.e., the establishment of identity) of subjects that are using the system. As used herein, the term "subject" refers to any person or entity being authenticated. There are two primary types of authentication: user authentication and data authentication. User authentication is the process of determining whether the subject is who he claims to be. There are many possible ways of determining subject identity, and they come with varying degrees of security. Traditionally, subject authentication has been done in three ways: recognition of the subject, shared knowledge, and possession of a token by the subject.

When implementing shared knowledge for subject authentication, the system knows things about the subject that should not be common knowledge. When the subject demonstrates that he also knows these things, identification is achieved. The information typically used in the authentication procedures can be divided into two types: in-wallet data and out-of-wallet data. In-wallet data is information you know about yourself or can readily put your hand to. It includes your name, address, telephone number, drivers license number, social security number, checking account number, credit card numbers, mother's maiden name, and the like. This data forms the basis for some of the simpler authentication systems of the prior art.

Out-of-wallet data is information about you that would take you a little effort to find out, but that you probably have in your filing system or somewhere equally accessible with some effort. It includes information such as the amount of the last transaction with your checkbook or credit card, the holder and amount of your mortgage, your credit rating, your bank balance, and the like. Incorporating out-of-wallet information into an authentication system is more complicated, and thus, it is found less frequently in typical systems.

Passwords are a form of both shared knowledge and of tokens. For a password to work properly, both sides must know it, and only both sides must know it. Shared knowledge includes some nonobvious information as well. The billing address on your credit card, for example, is known to you, of course, but is accessible from the card issuer by any merchant who takes that credit card.

When performing a transaction, it is often necessary to fill out a form containing information important for the transaction. Quite apart from the need to authenticate the subject, the data in those forms must also be authenticated. Data authentication consists of applying business rules to the forms at the time of capture. This is done at the point of recognition for paper forms, and while the subject is online, in the case of Web forms. Data authentication can be as simple as ensuring a column of numbers adds up, or as complicated as verifying several associated tax forms to be sure a particular number was both correctly calculated and correctly copied.

In addition to attempting to overcome technological hurdles, typical authentication systems of the prior art must frequently overcome social hurdles as well. Many people are concerned with the growing availability of personal information on the Internet. There are equal concerns around too much information being stored in one place. This is especially true when the information is being stored by a governmental entity, raising "big brother" concerns. An authentication system based on shared information is more convenient and less expensive for the subject, but it is more invasive of privacy. A system based on shared information can only work when based on information that only the subject and the authenticator knows. Because the subject and the authenticator have no contact other than the current transaction, this means that the shared information must be private information about the subject that the authenticator also possesses.

Although everyone would prefer to keep private information in the hands of the subject, the alternative to using it is identity theft. A system that works entirely online, if denied access to private information, will be exposed to identity theft. One simply cannot prevent identity theft without some form of authentication. It is also clear that the security of an authentication system and its obtrusiveness are inversely related—the more secure the system, the harder it is to make it unobtrusive. This tension inherent in authentication processes illustrates one of the limitations of proposals such as the "national identity card." There are various proposed uses for such a card, but primary among them are prevention of identity theft, limiting social benefits to legal residents, tracking those derelict in child support and other payments, fighting drug trafficking, providing identification for travelers, and making it easier to track those in this country legally or illegally.

Each of these is a legitimate social concern. Nonetheless, any system based on a single card allowing access to a centralized source of identity-establishing information suffers from two important drawbacks. The first, is establishing that a presented card is itself legitimate. Although states recently have taken measures to protect their driver's licenses and ID cards from forgery, fake ID cards are a long-standing problem. It is, for example, very difficult to establish from an ID card whether two people who look alike are actually distinct individuals.

The security needs of both the nation and the individual citizens must always be balanced against the requirement to preserve a free and open society. Authentication system, as viewed on the whole, should not be deemed overly intrusive.

SUMMARY OF THE INVENTION

The present invention provides a method and system for authentication that are more secure, less intrusive, more flexible, and easier to keep current than the prior art. This is accomplished through strategically employing a verification engine for authentication procedures.

The engine accepts personal data from a subject being authenticated. Typically, the data can be collected from the subject as part of a financial transaction with an agency of the federal government, financial institution, or commerce entity, or incident to some security procedure, etc. As used throughout these systems and the attached claims, the entity requesting authentication of the subject is termed the "authentication client" or "client." The data collected from the subject can then be compared to information contained in independent databases. Each database queried returns a confidence rating indicating how well the data matches. The verification engine combines these rating and returns them to the client, which can apply business rules of its own to decide whether to accept the subject as a valid user. Fuzzy logic algorithms can be used to determine the various confidence levels.

There are three main components to the verification engine. See FIG. 1. The first component, client interface, controls access to the overall system by users. It provides a single interface, with a single set of commands, to all system clients. While the interface is standardized, it can still be customized based on the particular needs of each client. The second component interfaces with each remote database, speaking the language required by that database, both for querying and for receiving back the answers to queries. The third component, the verification core, operates in connection with the other two main components. It recognizes the queries sent to it by clients, because the queries are predefined based on the needs of the individual client. The verification core also possesses the protocols to translate those queries into queries to the individual databases, and it can assemble their responses into a coordinated response to the client.

The verification engine tightly controls the questions it asks of each independent database. This enables it to meet the stringent privacy requirements of many database holders, thus encouraging the use of their information in legitimate ways not previously allowed by the database operators. The verification engine also ties into a broad range of information providers. Because the verification engine has access to multiple databases that were previously unconnected, it can answer questions that cannot be answered by any single database. Because the verification engine controls access to those databases in ways established through agreement with the database owners, it overcomes the reluctance of many database owners to allow access to their information. Thus, it can include various databases previously unavailable for general use.

Information is stored where it has a legitimate reason to be stored: with the database owners that acquired the information as part of their ordinary businesses or affairs with the subject. The verification engine allows legitimate access to personal data concerning a subject being authenticated, but it keeps others from browsing. Authentication clients are only licensed for specific predefined queries. Queries designed to browse database records or "read-out" information are not enabled by the verification engine.

Additional aspects and advantages of this invention will be apparent from the following detailed description of preferred embodiments thereof, which proceeds with reference to the accompanying drawings.

DETAILED DESCRIPTION OF A PREFERRED EMBODIMENT

Embodiments consistent with the present invention provide the ability to authenticate a subject even if the subject has had no prior contact with the system and has had no access to digital signatures, certificates, or passwords. One example of such a subject would be a person who is ready to retire and wants to set up his Social Security payments. Such a subject would possess or have the ability to access a computer and a network connection, such as through the Internet, but he is presumed to be an otherwise unsophisticated user. Another example of a user requiring authentication would be a subject trying to effect an online payment at an online store, or a subject trying to effect a transaction with his financial institution. The problem is to authenticate these subjects without requiring undue effort on the part of the subjects. To facilitate clarity and for ease of discussion, the references to the subject herein will assume a remote individual or entity that is accessing the authentication system through a network, such as the Internet. It is equally within the scope of the present invention to conduct live, real-time authentication of the subject in-person.

A preferred embodiment of the present invention implements a verification engine for authenticating a subject using predefined queries requesting personal identifying information from the subject. The identifying information comes from multiple third-party databases that have gathered that information in the ordinary course of their business or other relationships and dealings with the subject. The engine itself can adopt a client-server architecture and can be modeled after systems such as those used with marked success in the postal and form recognition fields. The flexible design can enable processing of queries at rates up to 850 per minute and is scalable as demand on the system increases.

There are three main parts to the verification engine. The first part controls access to the overall system by authentication clients. It provides a single user interface, with a single set of commands, to all system users. The queries it can present, as discussed in detail below, however, can be tailored to the particular needs of a specific client. The second part interfaces with each remote database, speaking the language required by that database, both for querying and for receiving back the answers to queries.

The third part, functions in the middle, connecting the other two main parts. This part is termed the "verification core." It understands the queries sent to it by users. It knows how to translate those queries into queries for the individual databases. The verification core knows what questions each connected database can answer, how likely it is to provide an answer, how long it generally takes to do so, and it possesses functioning protocols for querying each database. The verification core can also assemble the responses from the various independent databases into a coordinated response to the authentication client. The verification core obtains this information through collaboration with the independent database operators to develop the specific queries that will be allowed for use in the authentication procedure.

Figure 1:
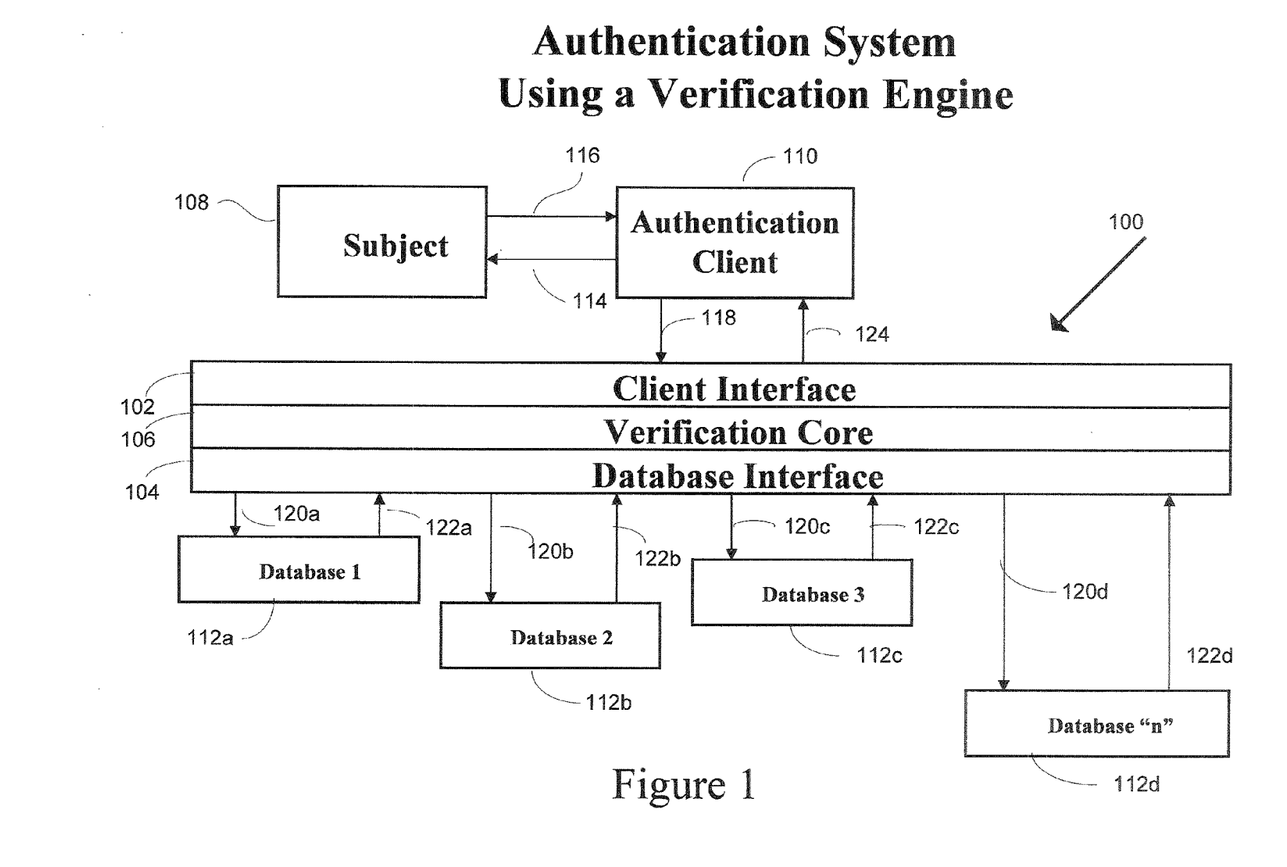
FIG. 1 is a schematic representation of an authentication system employing a verification engine consistent with the present invention.

FIG. 1 illustrates an authentication system incorporating a verification engine consistent with the present invention. With respect to FIG. 1, the verification engine 100 includes various components which include a client interface 102, a database interface 104, and the verification core 106. A subject 108 that either gives or requires authentication communicates with an authentication client 110. The subject 108 can provide identifying information to the authentication client 110, and the subject 108 can also answer queries posed by the authentication client 110. The authentication client 110 gives and receives information to and from the verification core 106 through the client interface 102. The verification core can then provide the information identifying the subject 108 to one or more independent, third-party databases 112a through 112d for authentication. Database "n" 112d illustrates that a potentially unlimited number of independent databases can be provided for authentication with the verification engine.

Figure 6:
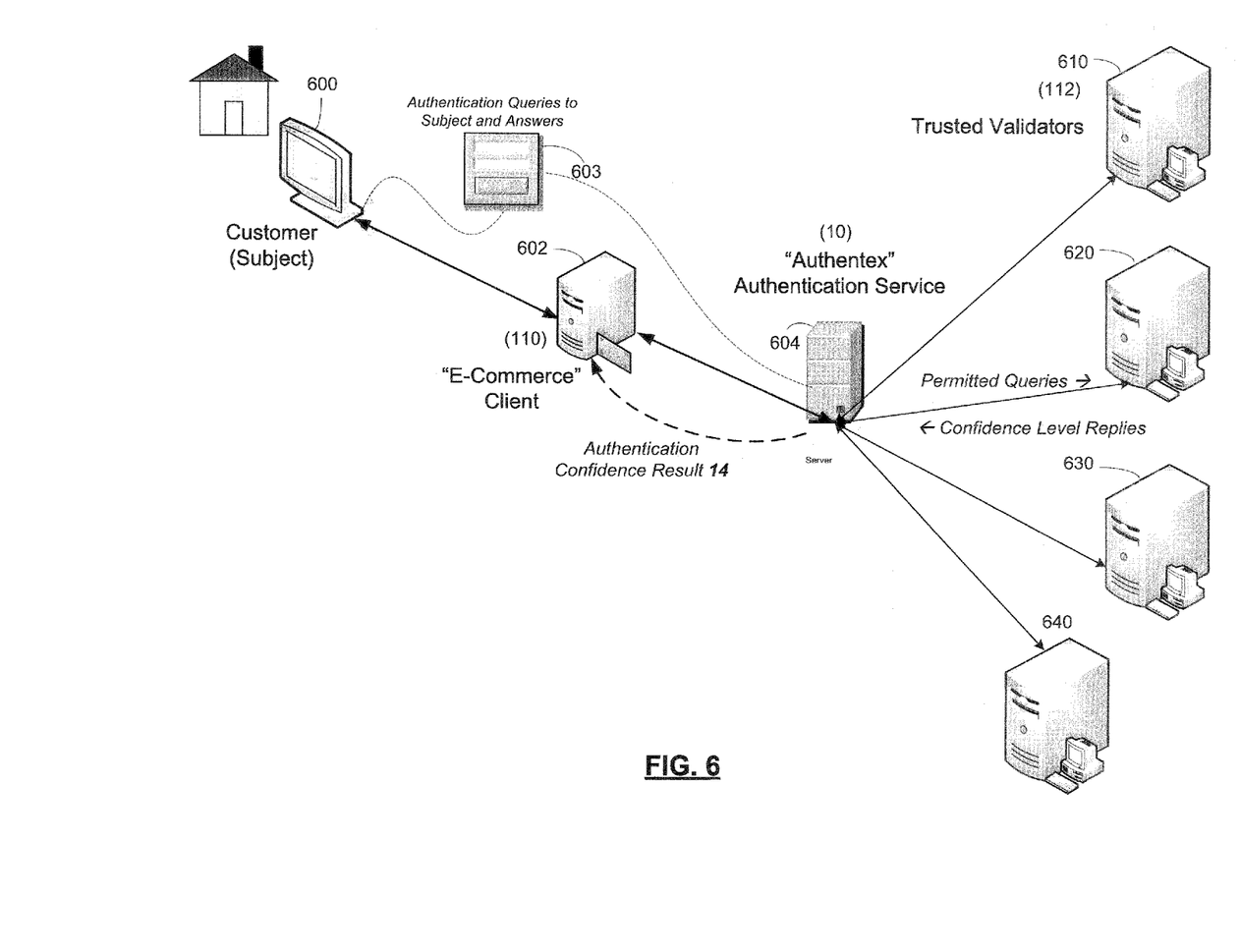
FIG. 6 is a simplified pictorial view of an authentication process in accordance with the composite view of FIG. 2.

Continuing with FIG. 1, after the subject 108 has identified himself to the authentication client 110, the authentication client 110 can present a predefined query 114 to the subject. This predefined query has been licensed for a specific use by this authentication client 110. The actual question and scope of the query depend on the authentication services being provided by the authentication client 110. The subject 108 then returns a response to the query 116. The authentication client 110 then forwards 118 the response to the verification engine 100 for authenticating the subject 108. The verification engine 100 then transmits 120a through 120d the response from the subject 108 to multiple of the databases 112a through 112d. Each database 112a through 112d that receives the information checks it against the identifying information it stores for the subject 108 and returns a confidence indication 122a through 122d to the verification engine. The verification engine 100 combines the individual confidence indications 122a through 122d into a combined confidence indication 124 that is provided to the authentication client 110 for authenticating the subject 108. FIG. 6 is a simplified pictorial view of an authentication process, further described below.

On the front end, the verification engine can establish the identity of its authentication client with standard digital certificates, passwords, and user names. Each authentication client has a specified list of questions it can ask the system. For example, an airport security guard (in possession of a passenger's driver's license) may only ask such a system "Does John Smith live at 123 Main Street, Jackson, Miss., and have Mississippi Driver's License number 549-34-2218?" The only response he can receive back is either a yes or a no, the confidence the system has in that answer, and possibly a picture of the legitimate holder of the license. He cannot, for example, ask: "who lives at 123 Main Street?"

If an FBI investigator is the authentication client, on the other hand, he may be authorized for considerably greater access to the system. He may, for example, be able to ask "Give me the passport numbers of all males of Bahrain residency who entered the United States through New York or Boston between May 6 and Jun. 7, 2001 on British Air or United Airlines flights from Paris or Zurich." The scope of permissible questioning would depend on the permissions the operator of the databases being asked to authenticate the responses would be willing to authorize. Because the system controls access by limiting the kinds of questions each type of user can ask, and because there is no central repository of the data, the system is much more protective of privacy.

On the back end, the system also has tight controls for the questions it asks of each database. This enables it to meet the stringent privacy requirements of many database holders. The ability to control the types of queries being made against the database provides many database providers the incentive, or at least comfort level to make their database available to the verification engine. The independent database operator can authorize a query to access whatever level of information they are comfortable with. This makes available the use of their information in legitimate ways that were not previously possible.

The verification engine system is designed to be both secure and unobtrusive. In a preferred embodiment, the only data the verification engine will have direct access to is certain low-sensitivity in-wallet data. See Authentex Personal Information Database 11 in FIG. 2. This information can come from several commercial sources. The data includes name, address, telephone number, and other personal information that most people do not consider particularly sensitive, but that help the engine authenticate a subject at the simplest level. The information can be obtained from the subject as part of a Web form when a person first uses the system. Asking for it as part of a Web form takes advantage of the habit of filling such information into forms. If done skillfully, most subjects will not even know we are using that information for authentication.

The more sensitive out-of-wallet data, such as creditworthiness and credit card information, remains in the hands of companies that naturally hold that information. We refer to these third parties as Trusted Validators (3 in FIG. 2.) Each trusted validator maintains its own database of customer information. (See Database 112a-112d in FIG. 1; Database 21 in FIG. 2 and FIG. 4; Although the verification engine will know the results of the queries, the information itself is never directly accessible by the verification engine or the authentication client. The verification engine simply provides a gateway to the information, thus offering a workable compromise between authentication and privacy. The system also meets the requirements of many governmental agencies by allowing access to personal data under tightly controlled conditions for legal, social, or medical needs.

The user information and the specific databases being used for authentication can vary widely. This affords the present system a significant amount of flexibility. One perfectly suitable commercial database available to the verification engine is the Crystal Database offered by RAF Technology, Inc. of Redmond Wash. Compiled from a wide range of reliable sources including the US Postal Service, this database is condensed into data crystals that take a fraction of the memory of the original and can be rapidly accessed. Crystallizing the data also obscures the information so that it cannot be read. As a result, the Crystal Database data crystals can be installed on the verification engine hardware without actually making the data visible to anyone. Access to the Crystal Database is strictly via predefined queries. In effect, the Crystal Database is lent, not given.

Other databases of personally identifying information can be obtained from such sources as VISANET, the Social Security Administration, the Internal Revenue Service, various of the national credit bureaus, national telephone directory services, etc. State-level sources of information can also be queried depending on the transaction involved. Examples include the Department of Motor Vehicles, the various taxation offices, etc.

Because there are multiple ways to establish identity, Security or law enforcement personnel can use the personal information databases in different, and unpredictable ways. Because the information is stored in multiple unrelated databases, it becomes extremely difficult for an identity thief or other criminal to place false data in all of them. Among the information and combinations it uses to establish identity are: name and aliases plus address; name plus telephone number(s); Social Security Number or other federal identifier; passport number; driver's license number; name plus mother's maiden name; name plus patronymic; bank account or other financial information; green card number; resident alien number, as well as many others.

Figure 2:
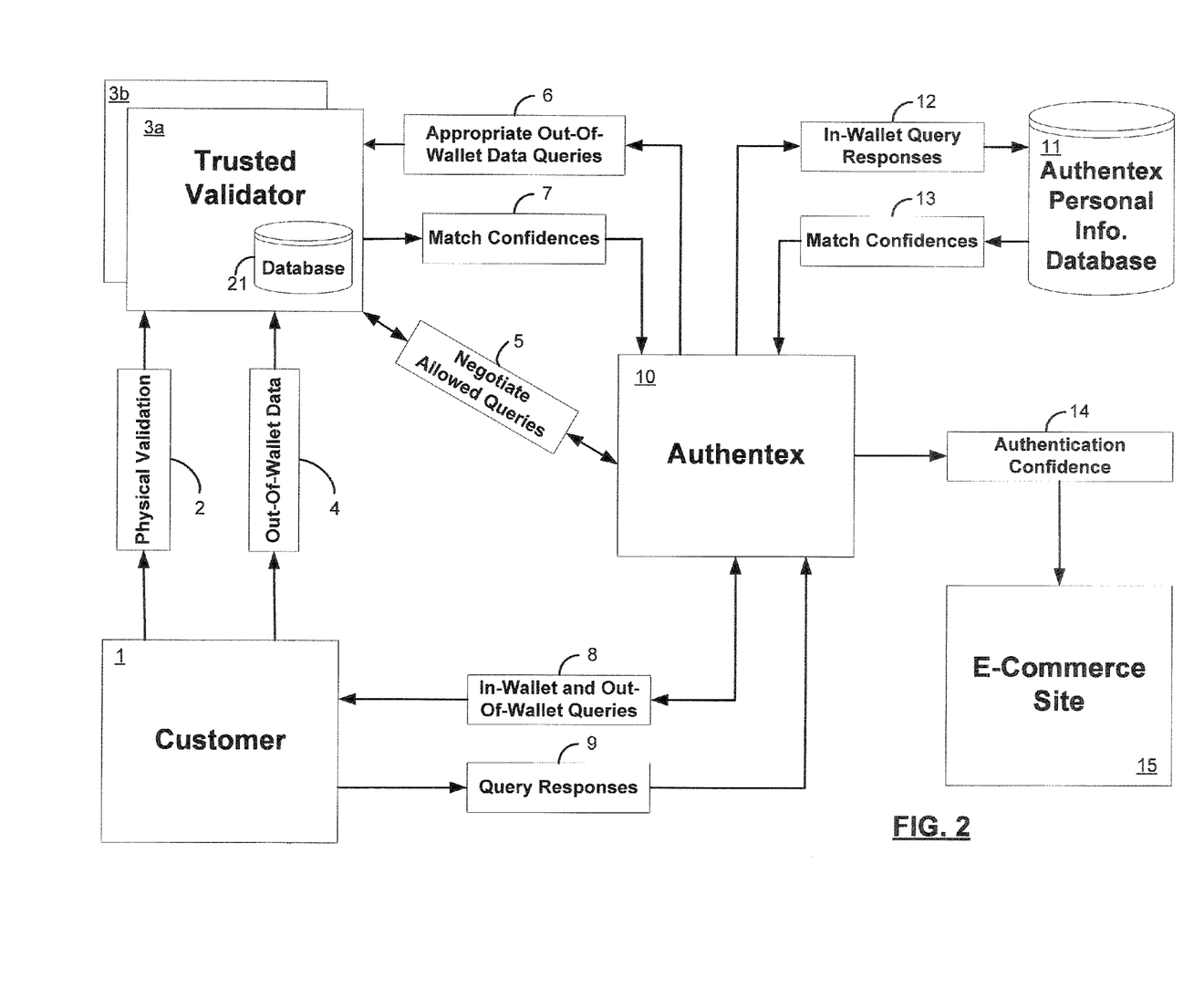
FIG. 2 depicts a specific embodiment of the present invention in the context of online authentication for an e-commerce transaction.
Figure 5:
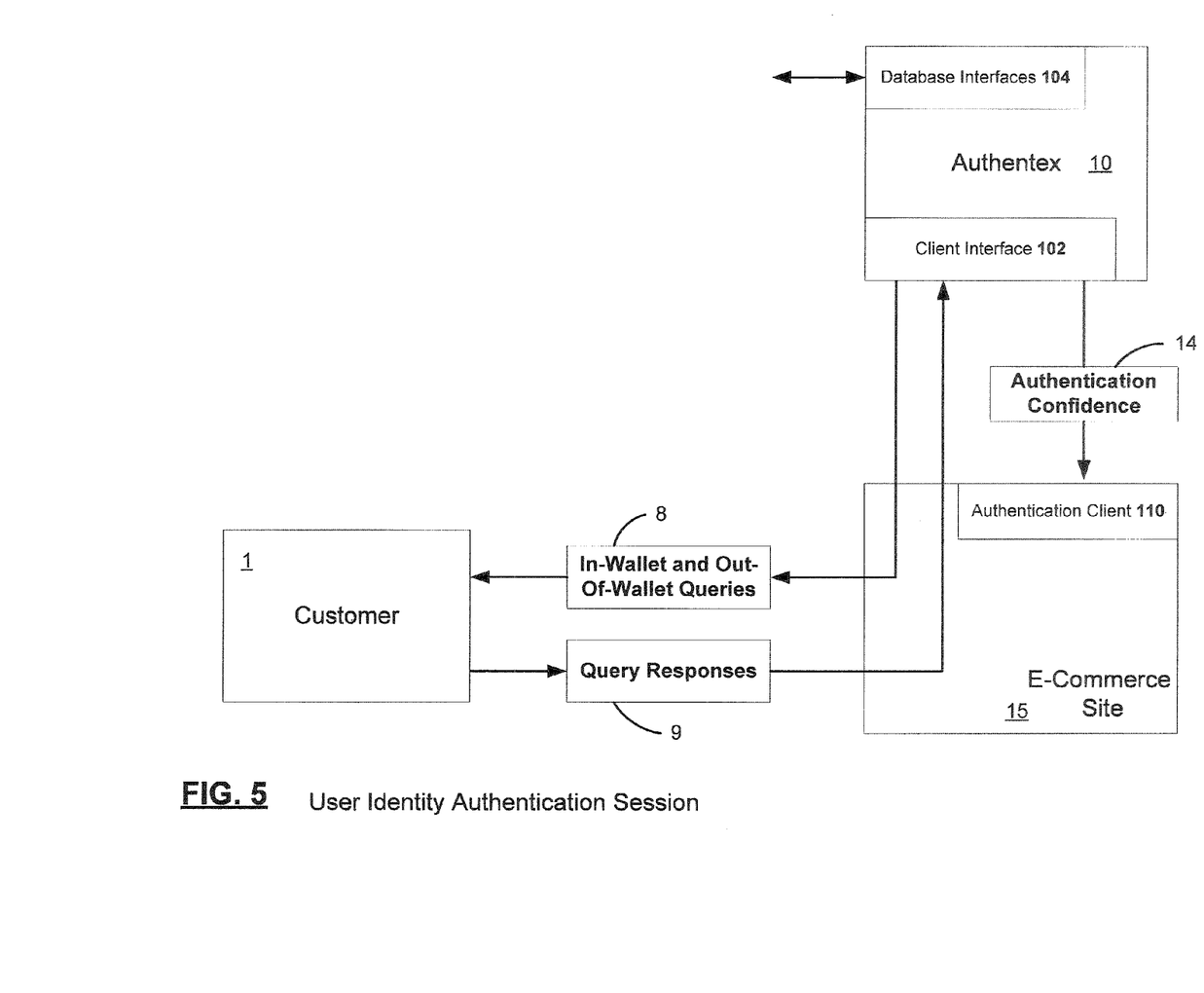
FIG. 5 illustrates an identity authentication session from the Customer's view.

FIG. 2 is a composite drawing illustrating several aspects and features of the invention. Portions of this drawing are highlighted in subsequent figures discussed below. First, we discuss operation of the verification engine in an authentication system provided for authenticating a subject in an electronic commerce transaction. In this context, the subject is labeled the "Customer," the authentication client is the "e-commerce site," the independent databases are the "trusted Validator (boxes 3a, 3b, etc.)," (e.g., Bank, Credit Bureau, etc.) and the verification engine is being operated by the "Authentex" entity. For simplicity in FIG. 2, the queries and response paths are illustrated as going directly to the verification engine, rather than through the authentication client. FIG. 5 illustrates the preferred embodiment more specifically. FIG. 2 illustrates both "real-time interactions" (e.g., in-wallet and out-of-wallet queries (box 8), query responses (box 9), appropriate out-of-wallet data queries (box 6), match confidences (box 7), in-wallet query responses (box 12), match confidences (box 13), and authentication confidence (box 14)) and "non real-time interactions" (e.g., negotiating the allowed queries (box 5), physical validation (box 2), and collecting out-of-wallet data (box 4)). However, any of the interactions may be either "real-time" or "non real-time."

Figure 3:
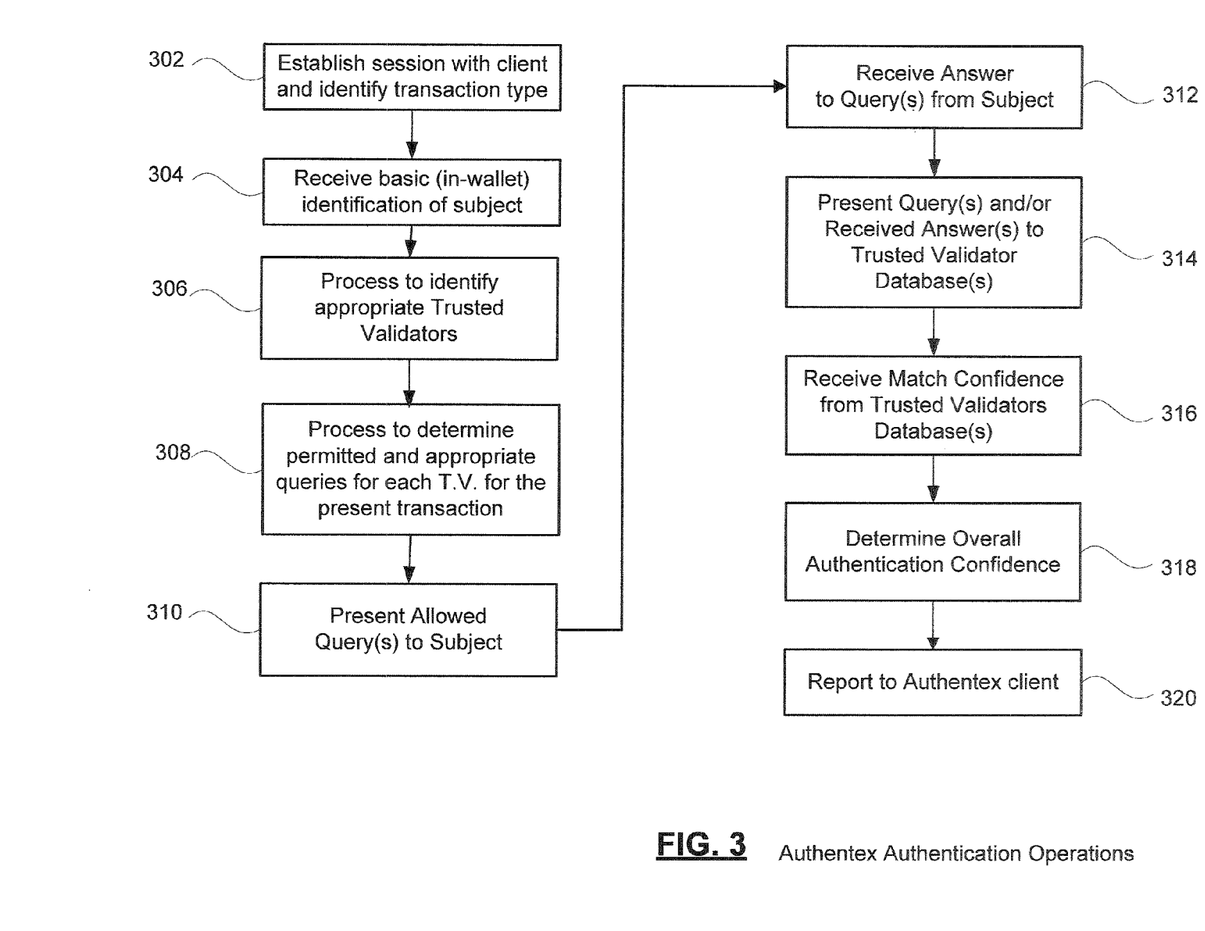
FIG. 3 is a simplified flow diagram of an authentication transaction of the verification engine or "Authentex" in an embodiment.

FIG. 3 is a simplified flow chart illustrating a method of user authentication according to one embodiment. At step 302, a session is established between the authentication engine ("Authentex") and an authentication client, such as an E-Commerce Site. This is best seen in FIG. 5, which is derived from FIGS. 1 and 2 and uses the original reference numbers. As mentioned, conventional secure login procedures may be used. A type of transaction is determined, as this affects the subsequent authentication procedures as discussed above. At step 304, the verification engine receives basic (in-wallet) data to tentatively identify the putative subject. This information is used by the verification engine, step 306, to determine which trusted validate(s) may be used for the requested authentication.

The next step determines which queries, among those permitted by the selected trusted validator(s), would be appropriate to accomplish the requested authentication. Next, the Authentex formulates those queries, and presents them to solicit answers from the subject, step 310. Referring to FIG. 5, these queries (8) may be passed through the E-commerce Site (15) to the subject. Preferably, however, the queries and answers pass directly between the Authentex verification engine and the subject, so that the subject's confidential data is not actually released to the E-commerce site. The interaction may be made to appear to the subject as though he is interacting only with the E-Commerce Site. This is why the lines in FIG. 5 that send queries and responses are drawn as passing through the E-Commerce site. See also FIG. 6, indicating at graphic 603 how the queries and answers in one embodiment may take the form of a web page fill-in box. The dashed lines show how the queries and answers effectively bypass the E-Commerce client.

Returning to FIG. 3, step 312, the answers are received from the subject in the verification engine. At step 314, the verification engine uses this data to formulate permitted queries to at least one of the trusted validators, step 314. This may be done through the database interfaces 104 in FIG. 1. In this way, the one or more allowed queries and/or the one or more received answers are presented to the independent, third-party databases. For example, with reference to FIG. 2, Authentex (box 10) can check the out-of-wallet data with the Trusted Validator (box 3). At step 316, match confidences are received from the independent, third-party databases. For example, after being asked an allowed query, the database may respond with a yes or no answer and the confidence the database has in that answer. Referring again to FIGS. 2 and 5, see the Authentication Confidence message (14).

Returning again to FIG. 3, at step 318, the verification engine combines the various confidence results from the trusted validators to determine an overall authentication confidence level. That result is communicated to the client, step 320, such as an E-Commerce Site 15. That client can make the final authentication decision for the transaction requested by its customer according to its own policies.

Figure 4:
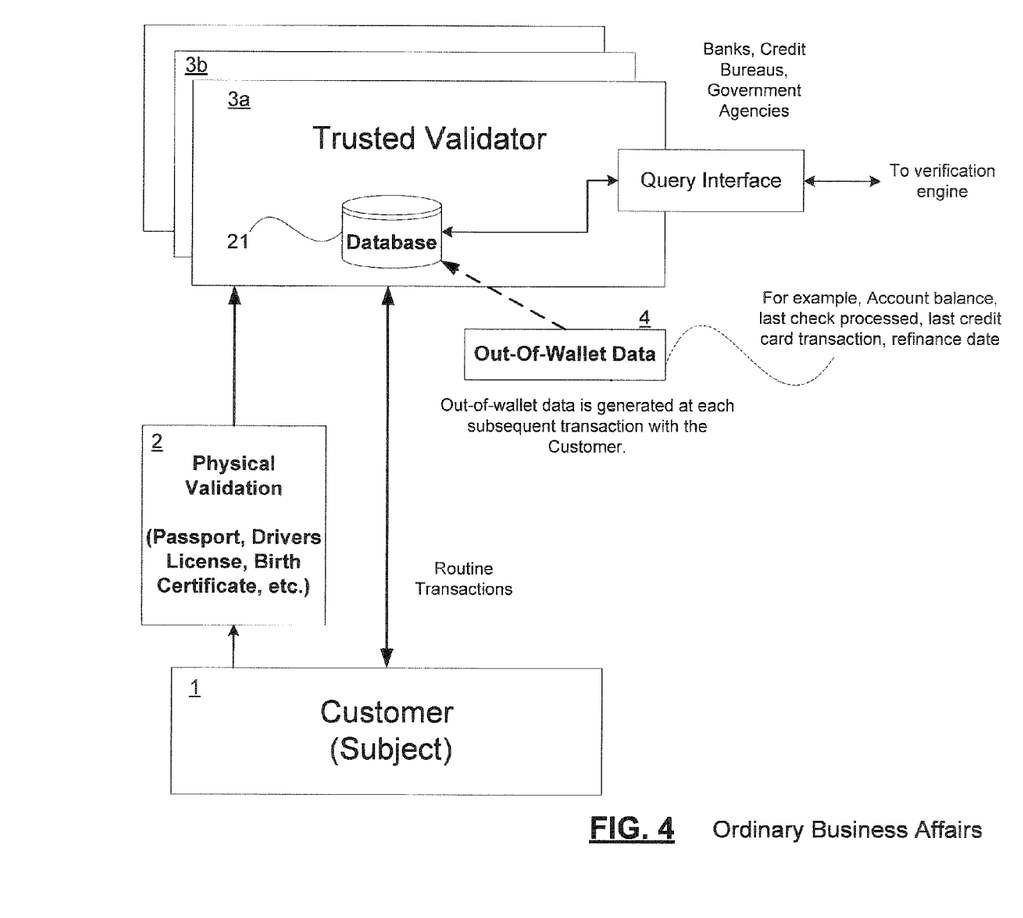
FIG. 4 is a simplified block diagram showing how "out-of-wallet data" may be generated in the ordinary course of business affairs between a customer (subject) and one or more trusted entities.

FIG. 4 extracts and highlights just the part of FIG. 2 that illustrates how a Trusted Validator develops its database. Referring now to FIG. 4, a Trusted Validator 3a establishes a relationship with a Customer 1. For example, when a customer opens a new bank account, or an account with the Social Security Administration, the customer 1 typically presents himself and documentation for physical validation, such as a Passport, Drivers License, Birth Certificate, etc. An account is established with the Trusted Validator, and thereafter, routine transactions are conducted, such as bank deposits, negotiation of checks, etc. In this way, as noted, Out-of-wallet data is generated at each subsequent transaction with the Customer. The Trusted Validator thus accumulates a collection of out-of-wallet data associated in the Database 21 with that customer. This data is kept confidential. All of this generally occurs prior to, and independently of, the Authentex system coming into play. That follows in the next paragraph.

Referring once again to FIG. 2, we describe an authentication transaction. Here, the Customer (box 1) logs onto an e-commerce site (box 15) for which Authentex (box 10) provides authentication. Toward that end, the E-commerce Site 15 has installed an Authentex Authentication Client (110 in FIG. 1). The Authentication Client (110) provides for interaction with the Authentex via its Client Interface (102 in FIG. 1). Returning to FIG. 2, the Customer 1 has engaged in a session with the E-Commerce Site 15, and requests a transaction for which the site requires authentication of the identity of the Customer. Toward that end, the site system will ask the Customer a series of appropriate questions (box 8) to authenticate his identity. These questions center on in-wallet data that Authentex itself possesses, and out-of-wallet data possessed by a trusted Validator (boxes 3a, 3b, etc.) such as a bank or credit bureau. Authentex holds in-wallet data and provides the gateway to Validators who hold out-of-wallet data.

FIG. 5 extracts and highlights just the part of FIG. 2 that illustrates interactions among the Customer, the E-Commerce Site and the Authentex during a transaction. These components retain the same reference numbers as in FIGS. 1 and 2. In this drawing, it can be seen that the queries and the customer's responses to them are passed through the E-Commerce Site 15 between the Authentex and the Customer, preferably in a transparent or "behind the scene" manner.

FIG. 6 is a simplified pictorial view of an authentication process in accordance with the composite view of FIG. 2. The Customer, using a computer 600 or the like, accesses an E-Commerce Site or other web site as before, illustrated here as a server 602. The E-Commerce site, which is a "client" of the Authentex service, accesses an Authentex server 604, for example using the Authentex Client process 110 shown in FIGS. 1 and 5. The Authentex server, in turn, communicates with one or more databases (112 in FIG. 1), maintained by corresponding Trusted Validators (3 in FIGS. 2 and 4), here illustrated as servers 610, 620, 630 and 640. As mentioned with regard to FIG. 5, queries and answers are passed between the Authentex server 604 and the customer machine 600 through the E-commerce server 602.

The queries are "appropriate" in that they fit the situation. Clearly, asking for name, address, phone number, and Social Security Number would be seeking appropriate in-wallet data that can be used to authenticate the Customer. Choosing appropriate out-of-wallet questions is more difficult. Out-of-wallet data (box 4) and physical validation (e.g., Passport, Drivers License, Birth Certificate, etc.) of the Customer (box 2) were collected by the Validator through the course of its normal interactions with the Customer, independent of any connection with Authentex. For example, the Trusted Validator (box 3) and the Customer (box 1) establish face-to-face interaction when the Customer opens a bank account. Out-of-wallet data is generated at each subsequent transaction with the Customer. The Validators build up a database of information, and a series of queries that can be put to that database. See FIG. 4. Authentex and the Validator establish a set of allowed queries (box 5) which is a subset of all the queries permitted by the Validator's database, chosen to provide proper authentication while being as unobtrusive as possible. Effectively, the Validator is digitally vouching for the Customer.

Choosing what queries are appropriate can be quite a challenge, and the queries can change with the nature of the requested transaction. If the Customer wants to set up automatic payments to his savings account, an appropriate question would be "what is your savings account number." Asking for his credit card number would be inappropriate.

Both in-wallet and out-of-wallet questions (box 8) are presented as items to be filled out in a Web form. This is far less obtrusive than direct questions, and seems much more natural to the Customer. In fact, if done skillfully, the Customer will never know he is being authenticated at all. The answers (box 9) to in-wallet queries are checked (box 12) against Authentex's Personal Information Database (box 11) and a confidence in the answers (box 13) returned to Authentex. The answers (box 9) to out-of-wallet queries are checked (box 6) against the Validator's database and a confidence in the answers (box 7) is returned to Authentex. Authentex assembles the answers and, using fuzzy logic, determines and passes on its overall confidence (box 14) to the e-commerce site, which makes the final authentication decision.

It should be noted that the verification engine can simultaneously serve multiple authentication clients. Similar, each authentication client employ the verification engine to authenticate multiple subjects.

The present invention also provides a suitable solution to the "national identity card" debate. The verification engine fulfills the legitimate needs of a national identity system and information bank, while meeting the privacy concerns of individual citizens. It meets the needs of citizens by leaving their personal data in the possession of those whom they perceive as having legitimate need for open access to it.

It will be obvious to those having skill in the art that many changes may be made to the details of the above-described embodiments of this invention without departing from the underlying principles thereof. The scope of the present invention should, therefore, be determined only by the following claims.

The invention claimed is:

1. A computer-implemented user identity authentication method comprising:
presenting one or more predefined queries to an authentication subject, wherein the predefined queries are permitted by each of multiple independent, remote, third-party databases storing identifying information about the authentication subject, wherein the databases are configured to accept and process only certain predefined permitted queries received from an authorized verification engine, and the databases are not selected by the authentication subject, and wherein at least one query presented to the authentication subject requires knowledge of out-of-wallet data associated with the subject to answer the query;
receiving an answer to at least one of the predefined queries from the authentication subject;
transmitting at least one of the answers received from the authentication subject, combined with an indication of the corresponding permitted query, to at least one of the multiple independent databases that has corresponding identifying information;
obtaining from said at least one of the multiple independent databases a corresponding authentication confidence level for each transmitted answer, wherein the multiple independent database contents are not disclosed; and
combining the authentication confidence level obtained from the multiple independent databases for each answer into a combined confidence level for authenticating the authentication subject.

2. A method of authenticating the putative identity of a subject who is an individual, the method comprising the steps of:
negotiating a predetermined set of permitted types of queries with an owner of an independent, remote, third-party database, the independent, remote, third-party database including identifying information associated with the subject;
providing a database interface for interacting with the independent, remote, third-party database without storing any significant portion of the third-party database locally, and wherein the interaction is limited to submitting a query among the predetermined set of permitted types of queries, and receiving from the third-party database a response to the permitted query;
responsive to a request from a client to authenticate the putative identity of the subject, forming a first query to elicit from the subject at least one item of information sufficient to form one of the permitted types of queries, and sending the first query to the subject via the client;
receiving identifying information associated with the subject in response to the first query to authenticate his identity, the received identifying information including at least one item of information sufficient to form one of the permitted types of queries;
forming a permitted type of query based on the received identifying information;
transmitting the formed query to the remote, third-party database; and
receiving a response from the remote, third-party database wherein the database interface does not otherwise provide access to the remote, third-party database, so that privacy of the remote, third-party database content remains under control of its owner.

3. The method of claim 2 and wherein said receiving the identifying information associated with the subject transpires in a live interaction with the subject in person.

4. The method of claim 2 and wherein receiving the identifying information associated with the subject is through a computer network.

5. The method of claim 4 including receiving the identifying information associated with the subject via the Internet.

6. The method of claim 2 and wherein the database interface enables interaction with multiple independent, remote, third-party databases without storing any significant portion of any of said databases locally, so that privacy of the remote, third-party database contents remain under control of their respective owners.

7. The method of claim 5 wherein the authentication client includes an electronic commerce site.

8. A computer-implemented identity authentication system comprising:
   an authentication client software component configured to enable a business client software component to communicate with a verification engine to request authentication of the identity of a customer;
   a software-implemented verification engine to authenticate the identity of a customer at the request of the business client, wherein the verification engine includes—
      a client interface for communication with the authentication client software component;
      database interfaces configured for communications with multiple independently operated databases, to enable sending permitted queries to the databases and receiving confidence levels returned from the databases;
      a client interface for sending at least one selected query to the customer, and for receiving a corresponding answer from the customer;
      means for forming a permitted database query based on the selected query and the corresponding answer received from the customer, and transmitting the permitted query to at least one of the independently operated databases via the database interfaces;
      means for combining the confidence levels returned from the databases to form an overall authentication confidence level that the subject is in fact who he purports to be; and
      means for transmitting the overall authentication confidence level to the requesting business client via the client interface.

9. A computer-implemented identity authentication system comprising:
   an authentication client software component to enable a business client to communicate with a verification engine to request authentication of the identity of a customer;
   a software-implemented verification engine to authenticate the identity of the customer at the request of the business client, wherein the verification engine includes—
      a client interface for communication with the authentication client software component;
      database interfaces configured for communications with multiple independently operated databases, to enable sending permitted queries to the databases and receiving confidence levels returned from the databases;
      means for sending at least one selected query to the customer, and for receiving a corresponding answer from the customer;
      means for forming a permitted database query based on the selected query and the corresponding answer received from the customer, and transmitting the permitted query to at least one of the independently operated databases via the database interfaces;
      means for combining the confidence levels returned from the databases to form an overall authentication confidence level that the subject is in fact who he purports to be; and
      means for transmitting the overall authentication confidence level to the requesting business client via the client interface; and wherein:
   the multiple independently operated databases each stores information associated with the customer, wherein the database information includes confidential, out-of-wallet data previously acquired by the corresponding database operator in the course of doing business with the customer;
   the databases are configured to accept and process only certain predefined permitted queries received from an authorized verification engine, and to respond to the permitted queries by returning a confidence level as to whether or not data contained in the query is consistent with the confidential, out-of-wallet data stored by the database in association with the subject; and
   wherein the database does not return or otherwise disclose the confidential, out-of-wallet data stored by the database in association with the subject.

10. The system of claim 9 wherein at least one of the independently operated databases is maintained by a financial institution.

11. The system of claim 9 wherein at least one of the independently operated databases is maintained by a federal government agency.

12. The system of claim 9 wherein at least one of the independently operated databases is maintained by a state government agency.

* * * * *